Aug. 17, 1954     W. H. ODLUM ET AL     2,686,582
REVERSIBLE DRIVE MECHANISM
Filed March 22, 1952
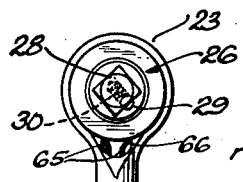
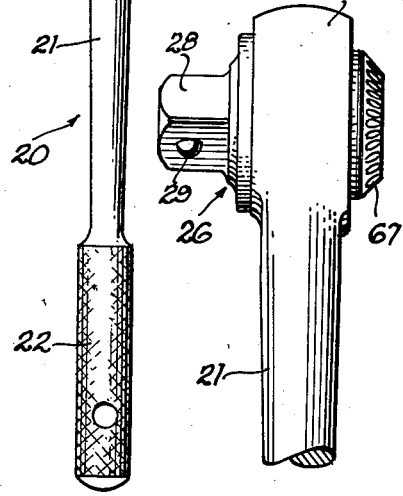
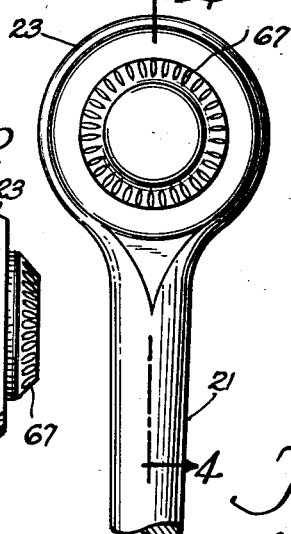
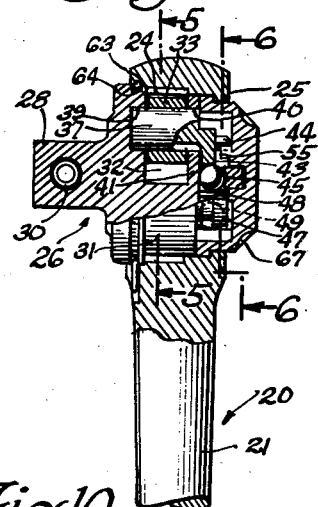
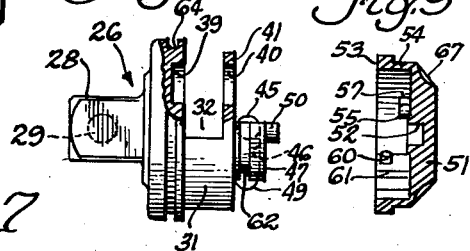
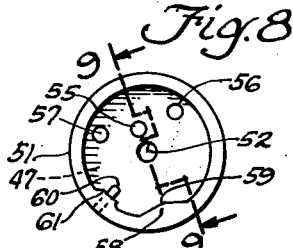
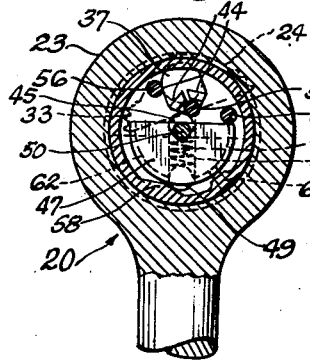
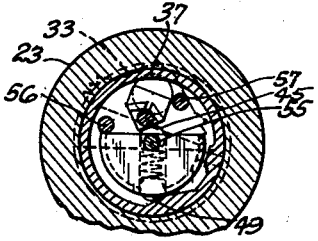
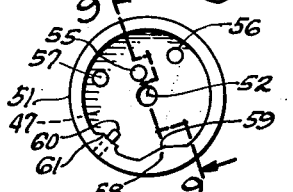
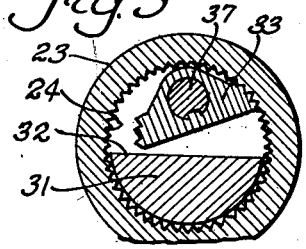
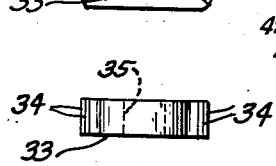
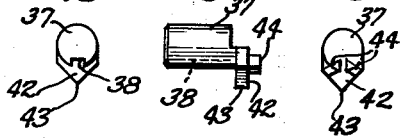
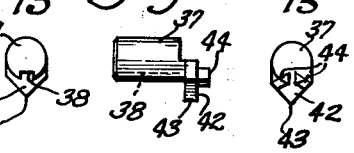
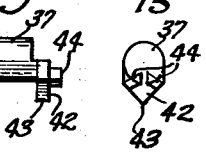
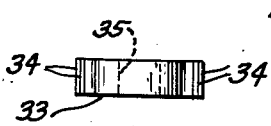
INVENTORS:
William H. Odlum
William F. Hosford
BY
Attorney Patented Aug. 17, 1954

2,686,582

UNITED STATES PATENT OFFICE 2,686,582

REVERSIBLE DRIVE MECHANISM

William H. Odlum, Wilmette, and William F. Hosford, Chicago, Ill., assignors to Duro Metal Products Co., Chicago, Ill., a corporation of Illinois Application March 22, 1952, Serial No. 278,089

2 Claims. (Cl. 192—43.1)

Our invention relates to reversible-drive mechanisms and particularly to those adapted for use for driving tools and the like.

An object of our invention is to provide a reversible-drive mechanism for use in driving tools such as wrench sockets, screw drivers, bits, and the like, which mechanism is constructed so as to be incapable of remaining in a condition of adjustment in which the driving and driven parts are disengaged, whereby the mechanism will not transmit driving force in one direction of rotation. A reversible-drive mechanism normally has a one-way-drive element, such as a pawl, which occupies different and spaced positions for transmitting driving force from the driving to the driven parts in each of the two directions of rotation. Between the positions for effecting the transmission of driving force in one direction or the other, it has been common in other devices of this type for the driving element to have a sort of dead-center position in which it does not transmit driving force in either direction, and in which instance the driving and driven parts of the mechanism can rotate freely in respect to one another. For reasons including safety considerations and good operating characteristics, it is desirable to avoid this condition.

Another object of the invention is the provision of a reversible-drive mechanism of the ratchet type that is enclosed in a manner providing a good seal against the entrance of foreign matter, such as dirt. It is necessary to keep foreign matter, including dirt and grit, out of a mechanism of the type herein considered, so that the one-way-drive element of the mechanism may function properly and may easily be shifted between positions in which it transmits driving force in either of the two directions of rotation.

A further object is to provide a reversible-drive mechanism for wrenches and the like which is adapted to ease of assembly and contains parts which are subject to manufacture without excessive cost.

Other objects and advantages of the invention will be apparent from the following description and the accompanying drawings in which similar characters of reference indicate similar parts throughout the several views.

In the one sheet of drawings:

Figs. 1, 2 and 3 are respectively front, side and rear elevational views of a driving tool that embodies the reversible-drive mechanism of our present invention;

Fig. 4 is a sectional view, partially in side elevation, depicting the assembly of the drive mechanism of our invention, wherein the section shown is taken substantially on a line 4—4 of Fig. 3 and in the direction of the arrows;

Fig. 5 is a sectional view taken substantially on the line 5—5 of Fig. 4, in the direction of the arrows, and shows the parts of the mechanism in position for effecting the transmission of driving force in one direction;

Fig. 6 is a sectional view that is taken substantially on a line 6—6 of Fig. 4, in the direction of the arrows, but with the driving member omitted and the pawl positioned for transmitting driving force in the same direction as in Fig. 5;

Fig. 7 is a sectional view that is similar to Fig. 6, but shows the pawl positioned for transmission of driving force in a direction opposite to that contemplated in Fig. 6;

Fig. 8 is an inside end view of a controller element forming a part of our reversible-drive mechanism;

Fig. 9 is a sectional view of the controller element wherein the section is taken on the line 9—9 of Fig. 8 and in the direction of the arrows;

Fig. 10 is a side view of the driven member of the reversible-drive mechanism, with portions of the driven member broken away and shown in section;

Figs. 11 and 12 are respectively front elevational and plan views of a pawl employed in our disclosed reversible-drive mechanism; and Figs. 13, 14 and 15 are rear, side and front elevational views, respectively, of a stud shaft element upon which the pawl is mounted.

In the adaptation of the invention depicted in the various figures of the drawings for illustrative purposes, a driving member 20 comprises a lever arm 21 having a grip 22 at one end and a hollow circular head portion 23 at the other end. On its interior, the head portion 23 has a peripheral row of integrally formed ratchet teeth 24 and an inwardly projecting shoulder 25 spaced axially from the ratchet teeth.

Mounted interiorly of the hollow head portion 23 is a driven member 26 provided with an axially projecting tool-driving shank 28 which carries a movable ball detent 29 resiliently backed by a spring 30 in a recess at one side of the shank. The ball 29 projects somewhat from the recess and is prevented from escaping therefrom by a shoulder (not shown) formed at the outer end of the recess. The ball is thus yieldingly held by the spring 30 against the shoulder in a partially protruding position, as shown in Figs. 1 and 2, whereby the shank 28 may be inserted into a suitable socket in a tool and releasably held therein.

The driven member 26 has a generally round body portion 31, as depicted in Fig. 10, which body portion has therein a cross slot 32 to provide space in which a double-ended pawl 33 is mounted for rocking movement between two operating positions. As shown in Fig. 11, the pawl has sets of ratchet teeth 34 at its opposite ends, and has a central opening 35 provided with a key 36. In the assembly of the mechanism, the pawl 33 is mounted on, and is slidably keyed to a stud shaft 37 which has a keyway 38 to receive the pawl key 36. The stud shaft 37 has one end journaled in a circular recess 39 in one end of the body portion 31 and extends through an axially aligned bore 40 in a wall 41 on the body portion 31. The end of the shaft 37 which extends beyond the wall 41 has thereon an integral offset projection 42 which has faces meeting in an axially disposed edge 43 and is provided at its outer end with angularly related projecting flanges 44, as shown in Figs. 13, 14 and 15.

The edge 43 and the faces of the projection 42 are aligned for engagement with a ball 45 which is located in a bore 46 in an end extension 47 on the body portion 31 of the driven member 26. The end extension 47 is somewhat more than semi-circular in section and has a flat face and an arcuate surface. As shown in Figs. 4, 6 and 7, the ball is urged against the edge 43 or the angularly disposed faces, and is caused to protrude from the flat face of the end extension 47 by a coil spring 48, one end of which engages the ball 45 and the other end of which engages a ball 49 at the opposite end of the bore 46, which latter ball protrudes beyond the arcuate surface of the end extension 47 of the driven member 26.

The end extension 47 has a centering projection 50 which is received in a bearing bore 52 in a controller 51. The controller is mounted for rotation in the hollow head portion 23 of the driving member 20 and is retained axially by a flange 53 on a rim portion 54 of the controller which fits between the body portion 31 of the driven member 26 and the flange 25 on the hollow portion 23 of the driving member 20. The controller 51 has thereon a protrusion 55 which fits between the angularly related projecting flanges 44 on the stud shaft 37 to engage one or the other of said flanges when the controller 51 is angularly shifted for the purpose of effecting angular shifting of the stud shaft 37 and the pawl 33. The controller also has protrusions 56 and 57, as shown in Fig. 8, which are spaced from opposite sides of the protrusion 54. Protrusion 56 engages the flat face of the end extension 47 of the driven member 26 when the parts are in the positions illustrated in Fig. 7; whereas protrusion 57 engages the flat face of the end extension 47 of the driven member 26 when the parts are at the positions of Fig. 6. The rim 54 of the controller 51 has an interior projection 58 which is provided with faces that are relatively disposed in obtuse angular relationship and meet in an edge 59, and which faces are selectively engaged by the spring-urged ball 49 carried in the end extension 47 of the driven member 26.

A pin 60 extends through an opening in a thickened region 61 of the controller rim 54 and into a groove 62 in the arcuate surface of the end extension 47 of the driven member 26. Thus, the controller 51 and the driven member 26 are pinned in their assembled relationship so that the ball 49 cannot escape from the bore 46 in the driven member 26. The driven member and controller being pinned to prevent their relative axial movement, the stud shaft 37 cannot become disengaged from the driven member. The projection 42 on the stud shaft 37 prevents the ball 45 from escaping from the bore 46. The assembly of driven member, controller, pawl, and stud shaft are retained in the hollow head portion 23 of the driving member 20 by a split retaining ring 63 which fits into an annular groove 64 at one end of the outer surface of the driven member 26 and an annular groove in the inner surface of the hollow head portion 23 at the end thereof opposite the shoulder 25 and facing the groove 64. Curved end portions 65 on the ends of the ring 63 extend into a recess 66 in the head portion 23 of the driving member and are thus exposed so that they can be pressed toward one another in order to contract the ring when the assembly of the driven member 26 and controller 51 is either to be put in place in the driving member 20 or removed therefrom.

In the position of the parts as they are shown in Figs. 5 and 6, the mechanism of our invention is adapted to transmit driving force from the driving member 20 to the driven member 26 in one direction (counterclockwise as viewed), because counterclockwise movement of the driving member 20 makes the right-hand end of the pawl 33 stay in engagement with the teeth 24 of the driving member and thus makes the pawl transmit drive between the driving and driven members, since with movement in this direction the teeth of the driving member engaged by the right-hand end of the pawl tend to move closer to the pawl axis, namely, the pawl shaft 37. When the driving member is rotated clockwise, it keeps moving the right-hand end of the pawl out of engagement with the teeth of the driving member and thus prevents the pawl from transmitting drive, since the teeth of the driving member engageable by the right-hand end of the pawl keep moving away from the pawl shaft 37.

In the position of the parts indicated in Fig. 7, the mechanism is adapted to transmit driving force in a clockwise direction, because now the left-hand end of the pawl is in engagement with the teeth 24 of the driving member, and clockwise movement of the driving member makes the left-hand end of the pawl stay in engagement with the teeth of the driving member and thus make the pawl transmit drive between the driving and driven members. When the driving member moves in a counterclockwise direction, it keeps moving the left-hand end of the pawl out of engagement with the teeth of the driving member and thus prevents the pawl from transmitting drive.

Both in the position of Fig. 6 and in that of Fig. 7, the pawl 33 may shift angularly when the driving member is moved in the appropriate non-driving direction of rotation, because the offset projection 42 on the pawl stud shaft 37 may cam the ball 45 back into the bore 46 in the end extension 47 on the driven member 26. When the movement of the driving member 20 in the non-driving direction stops, the spring 48 acts through the ball 45, the projection 42, and the stud shaft 37 to return the pawl 33 to engagement with the teeth 24 of the driving member.

The pawl 33 is shifted between the positions of Figs. 6 and 7 by angular movement of the controller 51 which is provided with a knurled beveled surface 67 to facilitate such angular movement by force applied with the operator's palm or fingers. The angular movement of the controller is transmitted to the stud shaft 37 through the protrusion 55 on the controller and its engagement with one projecting flange 44 or the other on the stud shaft 37, and the stud shaft transmits the angular movement to the pawl 33, because of the keyed connection of the pawl with the stud shaft. As this shift of the pawl occurs, the edge 43 of the offset projection 42 on the stud shaft 37 passes across the ball 45, pushing it into the bore 46 in the end extension 47 of the driven member against the biasing force of the spring 46. As this is taking place, the projection 58 on the interior of the controller 51 is passing across the ball 49, pushing it against the other end of the same spring 46. It is virtually impossible for the pawl to rest on a so-called "dead-center" position in which neither end engages the teeth 24 of the driving member 20, because at that time the edge 43 of the offset projection 42 would have to stay in contact with the spring-urged ball 45. This is unlikely to occur, because at this time the force of the spring 48 is increased to a maximum value which is exerted against the ball 45. The edge 59 on the projection 58 would also be unlikely to engage the ball 49 simultaneously with engagement of the edge 43 with the ball 45, because of looseness in the fit of the controller protrusion 55 in the raised portions 44 of the pawl shaft 37, and such simultaneous ball-and-edge engagements would be required for the parts to stay in the "dead-center" position.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim and desire to secure by Letters Patent of the United States, is:

1. A reversible drive assembly comprising a driving member having an opening therein which is provided with a set of teeth, a driven member mounted for rotation in the opening and having a slot therein with a wall at one side of the slot, a double-ended pawl mounted for movement in the slot and disposed for engagement with the teeth on the driving member, a stud shaft extending through and mounted in the wall, said stud shaft having one end drivingly connected with the pawl, an actuating part at the other end of the stud shaft, a controller mounted on the driving member and movable relative to the driving and driven members to positions of engagement with the actuating part for effecting movements of the pawl into engagement with the said teeth in either of two positions to establish a connection for the transmission of driving force between the driving and driven members selectively in either direction of rotation, and means for preventing the pawl from assuming a position in which it does not transmit a drive in either direction, said last-mentioned means comprising a ball and a spring mounted in the driven member, the ball engaging the actuating part, the spring urging the ball against the actuating part, and the actuating part having angularly disposed surfaces exposed to contact with the ball whereby the pawl is prevented from remaining out of engagement with the teeth on the driving member.

2. A reversible drive assembly comprising a driving member having an opening therein which is provided with a set of teeth, a driven member mounted for rotation in the opening and having a slot therein with a wall on one side of the slot, a double ended pawl mounted for movement in the slot and disposed for engagement with the teeth on the driving member, a stud shaft extending through and mounted in the wall, said stud shaft having one end drivingly connected with the pawl, an actuating part at the other end of the stud shaft, a controller mounted on the driving member and movable relative to the driving and driven members to positions of engagement with the actuating part for effecting movements of the pawl into engagement with the said teeth in either of two positions to establish a connection for the transmission of driving force between the driving and driven member selectively in either direction of rotation, and two balls and a spring mounted in the driven member, the balls being at opposite ends of the spring so as to be urged away from one another, the one ball engaging the actuating part, and the controller having a projection with angularly disposed surfaces engaging the other ball, whereby the force of the spring against said one ball is varied during movement of the controller.

References Cited in the file of this patent

UNITED STATES PATENTS

| Number | Name | Date |
|---|---|---|
| 1,957,462 | Kress | May 8, 1934 |
| 1,995,009 | Pfauser et al. | Mar. 19, 1935 |
| 2,103,556 | Rueb | Dec. 28, 1937 |
| 2,126,843 | Tintera et al. | Aug. 16, 1938 |
| 2,157,574 | Siesel | May 9, 1939 |
| 2,571,574 | Pfauser et al. | Oct. 16, 1951 |